(12) United States Patent
Wang et al.

(10) Patent No.: US 9,628,860 B2
(45) Date of Patent: Apr. 18, 2017

(54) VIDEO PUSHING METHOD, APPARATUS, AND SYSTEM

(71) Applicant: Anhui Huami Information Technology Co., Ltd., Hefei, Anhui (CN)

(72) Inventors: Hui Wang, Anhui (CN); Wang Huang, Anhui (CN)

(73) Assignee: Anhui Huami Information Technology Co., Ltd., Hefei, Anhui (CN)

( * ) Notice: Subject to any disclaimer, the term of this patent is extended or adjusted under 35 U.S.C. 154(b) by 0 days.

(21) Appl. No.: 14/817,708

(22) Filed: Aug. 4, 2015

(65) Prior Publication Data
US 2016/0105722 A1  Apr. 14, 2016

(30) Foreign Application Priority Data

Oct. 10, 2014  (CN) .......................... 2014 1 0531180

(51) Int. Cl.
| H04N 5/445 | (2011.01) |
| H04N 21/466 | (2011.01) |
| H04N 21/258 | (2011.01) |
| H04N 21/25 | (2011.01) |
| H04N 21/41 | (2011.01) |
| H04N 21/418 | (2011.01) |

(52) U.S. Cl.
CPC ....... *H04N 21/4668* (2013.01); *H04N 21/251* (2013.01); *H04N 21/25891* (2013.01); *H04N 21/4108* (2013.01); *H04N 21/4182* (2013.01)

(58) Field of Classification Search
CPC ........................... H04N 21/251; H04N 21/252
See application file for complete search history.

(56) References Cited

U.S. PATENT DOCUMENTS 7,840,986 B2 * 11/2010 Ali ........................ G11B 27/105
725/105
2002/0059094 A1 * 5/2002 Hosea .............. H04N 21/25891
725/10

(Continued)

FOREIGN PATENT DOCUMENTS

| CN | 103442285 A | 12/2013 |
| CN | 103458276 A | 12/2013 |
| CN | 103634669 A | 3/2014 |

*Primary Examiner* — Pankaj Kumar
*Assistant Examiner* — Timothy Newlin
(74) *Attorney, Agent, or Firm* — Young Basile Hanlon & MacFarlane, P.C.

(57) ABSTRACT

A video pushing method, a video pushing apparatus, and a video pushing system that recommend video to a user more precisely are described. An identity of a terminal device is received. User information associated with the identity is acquired where the user information includes personal information of a user and a viewing history of the user. Video content is selected according to the user information, and the selected video content is pushed to a smart television. The smart television plays video according to the video content. Further, a current user may be automatically identified according to an identity of a terminal device. Video content is selected for the user according to the user information, and the video content is pushed to a smart television and played. In this way, video content can be recommended to the user more precisely.

18 Claims, 5 Drawing Sheets

(56) References Cited

U.S. PATENT DOCUMENTS

| | | | | |
|---|---|---|---|---|
| 2005/0066339 A1* | 3/2005 | Thoen | H04N 21/234309 | |
| | | | | 719/328 |
| 2007/0078993 A1* | 4/2007 | Issa | H04N 7/17318 | |
| | | | | 709/229 |
| 2007/0288966 A1* | 12/2007 | Javid | H04N 7/17318 | |
| | | | | 725/46 |
| 2008/0319833 A1* | 12/2008 | Svendsen | G06Q 30/02 | |
| | | | | 705/7.29 |
| 2010/0306394 A1* | 12/2010 | Brown | H04L 63/0492 | |
| | | | | 709/229 |
| 2012/0324550 A1* | 12/2012 | Wasilewski | G06F 21/10 | |
| | | | | 726/5 |
| 2013/0046796 A1* | 2/2013 | Hossain | H04L 67/306 | |
| | | | | 707/803 |
| 2013/0145385 A1* | 6/2013 | Aghajanyan | G06Q 30/02 | |
| | | | | 725/10 |
| 2013/0185382 A1* | 7/2013 | Hardy | H04L 65/4076 | |
| | | | | 709/217 |
| 2013/0332962 A1* | 12/2013 | Moritz | H04N 21/2407 | |
| | | | | 725/46 |
| 2014/0088952 A1* | 3/2014 | Fife | G06F 17/27 | |
| | | | | 704/9 |
| 2014/0130076 A1* | 5/2014 | Moore | H04N 21/25883 | |
| | | | | 725/19 |
| 2014/0181878 A1* | 6/2014 | Wang | H04N 21/252 | |
| | | | | 725/87 |

\* cited by examiner

VIDEO PUSHING METHOD, APPARATUS, AND SYSTEM

CROSS-REFERENCE TO RELATED APPLICATION

This application claims priority to Chinese patent application no. CN 201410531180.6, filed Oct. 10, 2014, which is incorporated herein in its entirety by reference.

TECHNICAL FIELD

The present invention relates to the field of network-based technologies, and more particularly to a video pushing method, apparatus, and system.

BACKGROUND

With the development of technologies, smart televisions have gradually gained popularity. Smart televisions have "intelligent functions" that conventional televisions do not have. For example, smart televisions allow users to conveniently view programs on demand directly on the television, or even go shopping, play games and so on, and may also allow users to access Internet content through the television. These advances promote content consumption in a broader sense.

SUMMARY

A user may actively search for content. Further, there are many active content recommendation systems based on user behavior and characteristics that can recommend content that a user may like depending on information such as use habits and consumption history of the user. However, such a content recommendation method cannot count the current number of viewers, and cannot recommend different content to different users. For example, a person may view a smart television alone or with family or friends. In this case, the number of users watching the television may change all the time. The demands of the people watching the television cannot precisely be known, so the recommendation engine fails to recommend personalized content to different users according to their demands.

In contrast, embodiments of the present invention provide a video pushing method, apparatus, and system, so as to recommend video to a user more precisely.

A video pushing method described herein includes the steps of receiving an identity of a terminal device, acquiring user information associated with the identity, the user information including personal information of a user and a viewing history of the user, selecting video content according to the user information, and pushing the selected video content to a smart television, so that the smart television plays video according to the video content.

Beneficial effects of the embodiments of the present invention may include that: a current user is automatically identified according to an identity of a terminal device, a video content is selected for the user according to the user information, and the video content is pushed to a smart television and played, whereby the video content can be recommended to the user more precisely.

Optionally, receiving an identity of a terminal device includes receiving a broadcast data packet from the terminal device, and parsing the broadcast data packet to obtain the identity of the terminal device. The broadcast data packet may be transmitted over a network, such as the Internet, a wide area network (WAN), a local area network (LAN), etc., and may be transmitted over more than one network.

In an optional solution, a current user is automatically identified according to an identity of a terminal device, video content is selected for the user according to the user information, and the video content is pushed to a smart television and played, whereby the video content can be recommended to the user more precisely.

Optionally, when identities of at least two terminal devices are received, acquiring user information associated with the identity, the user information including personal information of a user and a viewing history of the user includes separately acquiring user information associated with each of the identities to obtain at least two pieces of user information, the user information including personal information of the user and a viewing history of the user. Further, selecting video content according to the user information includes separately selecting respective video content that matches each of the identities and selecting video content of the same type from the video content that matches each of the identities.

In an optional solution, when a case in which multiple users watch video at the same time is supported, video is recommended based on the user information of the users, so as to recommend video content to the users more precisely.

Optionally, before receiving an identity of a terminal device, a method described herein further includes associating the identity with the user information and storing the identity and the user information that have been associated.

In an optional solution, the user information may be acquired according to a pre-stored association relationship, so as to recommend a video content to the user more precisely.

Optionally, the method further includes recording the video content broadcast by the smart television and storing the video content that is broadcast by the smart television into the viewing history corresponding to the user information. The viewing history corresponding to the user information is thus updated.

In an optional solution, the video content that is broadcast responsive to the received video content is collected and stored, and the viewing history of the current user can be updated in time. In this way, the next time the user wants to watch video, video content can be recommended to the user more precisely, and linkage to other network behaviors is also achieved. In these implementations, the network may be the Internet, but others networks over which a server, a terminal device and a smart television may communicate may be used.

A video pushing apparatus may include a receiving module configured to receive an identity of a terminal device, an acquiring module configured to acquire user information associated with the identity, where the user information including personal information of a user and a viewing history of the user, a selecting module configured to select a video content according to the user information, and a pushing module configured to push the selected video content to a smart television so that the smart television plays video according to the video content. The video content may be pushed to the smart television over a network such as the Internet.

Optionally, the receiving module includes a receiving unit configured to receive a broadcast data packet from the terminal device and a parsing unit configured to parse the broadcast data packet to obtain the identity of the terminal device.

Optionally, the acquiring module includes an acquiring unit. The acquiring unit is configured to, when identities of at least two terminal devices are received, separately acquire user information associated with each of the identities to obtain at least two pieces of user information. The user information includes personal information of a user and a viewing history of the user. The selecting module may include a first selecting unit that is configured to separately select video content that respectively matches each of the identities and a second selecting unit that is configured to select video content of a same type from the video content that matches each of the identities.

Optionally, the apparatus further includes an association module configured to associate the identity with the user information and a first storage module configured to store the identity and the user information that have been associated.

Optionally, the apparatus further includes a recording module configured to record the video content that is broadcast at this most recent, particular time. A second storage module is configured to store the video content that is broadcast at this time into the viewing history corresponding to the user information. Further, an updating module is configured to update the viewing history corresponding to the user information.

A video pushing system includes a server, a terminal device, and a smart television that are connected by one or more networks or wireless communication systems.

In the video pushing system, the server is configured to receive an identity of the terminal device, acquire user information associated with the identity, the user information including personal information of a user and a viewing history of the user, select video content according to the user information, and push the selected video content to the smart television so that the smart television plays video according to the video content.

The terminal device is configured to send a broadcast data packet, the broadcast data packet including the identity of the terminal device.

Finally, the smart television is configured to receive the broadcast data packet from the terminal device, parse the broadcast data packet to obtain the identity of the terminal device, send the identity to the server, receive the video content pushed from the server, and play video according to the video content.

Optionally, the server is configured to receive the broadcast data packet from the terminal device and parse the broadcast data packet to obtain the identity of the terminal device.

Additional features and advantages of the present invention will be set forth in the description which follows, and in part will be apparent from the description, or may be learned by practice of the present invention. The objectives and other advantages of the present invention will be realized and attained by the structure particularly pointed out in the written description and claims hereof as well as the appended drawings.

The technical solutions of the present invention are described in further detail below with reference to the accompanying drawings and embodiments.

BRIEF DESCRIPTION OF THE DRAWINGS

The accompanying drawings, which are included to provide a further understanding of the present invention and constitute a part of this specification, are used for explaining the present invention together with embodiments of the present invention. In the drawings.

DETAILED DESCRIPTION

Certain embodiments of the present invention are described below with reference to the accompanying drawings. It should be understood that the embodiments described herein are provided for describing and explaining the present invention only, and are not intended to limit the present invention.

Figure 1:
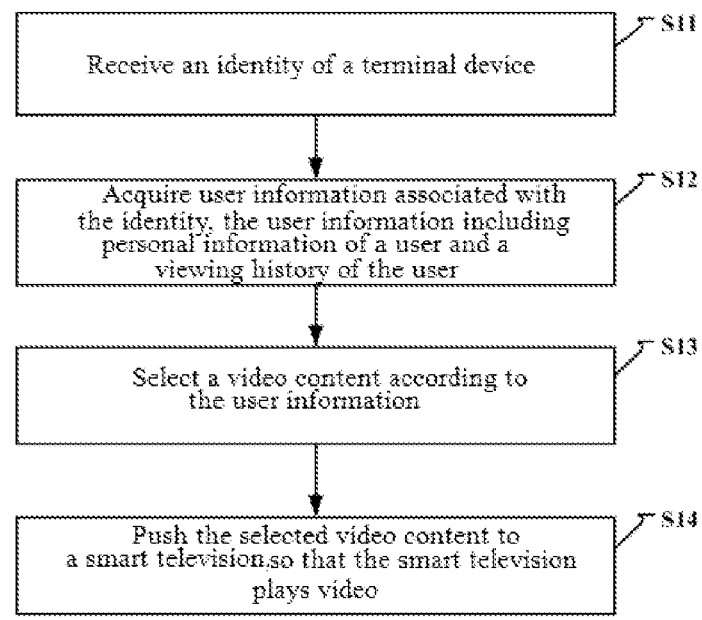
FIG. 1 is a flowchart of a video pushing method according to an embodiment of the present invention.

An embodiment of the present invention provides a video pushing method. As shown in FIG. 1, the method includes steps S11 to S14. At step S11, an identity of a terminal device is received. At step S12, user information associated with the identity is acquired. The user information may include personal information of a user and a viewing history of the user. The personal information of the user may include the age, gender, interests or other information of the user.

Video content is selected according to the user information at step S13. The, at step S14, the selected video content is pushed to a smart television, so that the smart television plays video according to the video content.

By means of this embodiment, a current user is automatically identified according to an identity of a terminal device, a video content is selected for the user according to the user information, and the video content is pushed to a smart television and played. In this way, the video content can be recommended to the user more precisely. Moreover, for the same smart television, if the terminal device changes, the identity received by the network side also changes accordingly. In this way, corresponding video content can be recommended to different users.

In this method, before step S11 is implemented, associating the identity with the user information and storing the identity and the user information that have been associated may be implemented.

In a modification of this method, receiving the identity of the terminal device in step S11 may be implemented receiving a broadcast data packet from the terminal device, and parsing the broadcast data packet to obtain the identity of the terminal device.

The terminal device may be any device having wireless communication ability. For example, the terminal device may be a smart wristband communicating using the Bluetooth function. The terminal device may be provided with a Bluetooth chip, and the Bluetooth chip may be controlled by a controller inside the terminal device to periodically send a broadcast data packet, the broadcast data packet including the identity of the terminal device. One terminal device is only bound to one user identity, that is, the identity included in the broadcast data packet sent by the terminal device is unique.

When the broadcast data packet is used to obtain the identity of the terminal device, the network side receives the broadcast data packet from the terminal device and parses the broadcast data packet to obtain the identity of the terminal device. Alternatively, the smart television receives the broadcast data packet from the terminal device and parses the broadcast data packet to obtain the identity of the terminal device. Then, the smart television sends the obtained identity of the terminal device to the network side so that the network side acquires the user information according to the received identity, and further selects the video content according to the user information.

In an embodiment, the video pushing method may also support a case in which multiple terminal devices send a broadcast data packet at the same time, that is, a case in which identities of at least two terminal devices are received. In this case, acquiring user information associated with the identity at step S12 may be implemented by separately acquiring user information associated with each of the identities to obtain at least two pieces of user information, the user information including personal information of a user and a viewing history of the user. In addition, selecting the video content at step S13 is implemented as separately selecting video content that matches each of the identities, and selecting video content of the same type from the video content that matches each of the identities. In other words, video content is selected for each of the users separately, and then one or more selections of video content that is identified for each of the users is selected as the video content for possible playback. The video content may be of the same type when each user has the same item within their selected video content, or the video content may be of the same type when an item in each of the user selections is a different version of the same video content.

In an embodiment, the method further includes recording the video content that is broadcast, and storing the video content that is broadcast into the viewing history corresponding to the user information. The viewing history corresponding to the user information is thereby updated.

Figure 2:
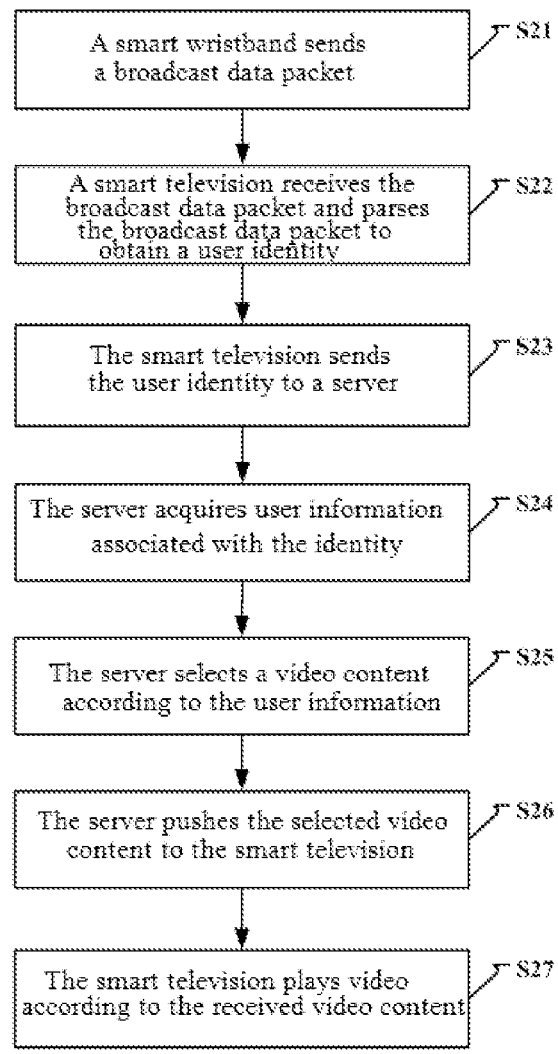
FIG. 2 is a flowchart of a video pushing method according to another embodiment of the present invention.

FIG. 2 is a flowchart of a video pushing method according to another embodiment of the present invention. In this embodiment, the terminal device is a smart wristband, and the smart wristband is provided with a Bluetooth chip. The Bluetooth chip operates in Bluetooth low energy (BLE) mode, is controlled by a controller inside smart wristband, and can periodically send a broadcast data packet. The broadcast data packet includes a user identity. The smart wristband only matches one user identity. As shown in FIG. 2, the method includes steps S21 to S27.

At step S21, the smart wristband sends a broadcast data packet. At step S22, a smart television receives the broadcast data packet and parses the broadcast data packet to obtain the user identity. The smart television then sends the user identity to a server at step S23.

At step S24, the server acquires user information associated with the identity. The user information includes personal information of a user and viewing history of the user, where the personal information of the user may include the age, gender, interests or other information of the user. Finally, the server selects video content according to the user information at step S25.

In some embodiments, the user information stored in the server may further include personalized information set by the user, for example, acoustic settings, television color, or a preset program channel set by the user. In these cases, the server may select the video content for the user according to the personalized information.

After the video content is selected, the server pushes the selected video content to the smart television at step S26. At step S27, the smart television plays video according to the received video content.

Beneficial effects of the embodiment of FIG. 2 may include that a current user is automatically identified according to an identity of a terminal device, video content is selected for the user according to the user information, and the video content is pushed to a smart television and played. In this way, video content can be recommended to the user more precisely.

Figure 3:
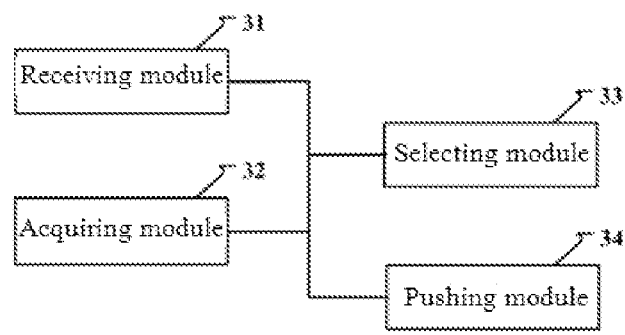
FIG. 3 is a block diagram of a video recommendation apparatus according to an embodiment of the present invention.

Corresponding to the method described above, a video recommendation apparatus can be used to recommend video to a user more precisely. As shown in FIG. 3, the apparatus includes a receiving module 31 configured to receive an identity of a terminal device, an acquiring module 32 configured to acquire user information associated with the identity, the user information including personal information of a user and a viewing history of the user, a selecting module 33 configured to select video content according to the user information, and a pushing module 34 configured to push the selected video content to a smart television, so that the smart television plays video according to the video content.

Figure 4:
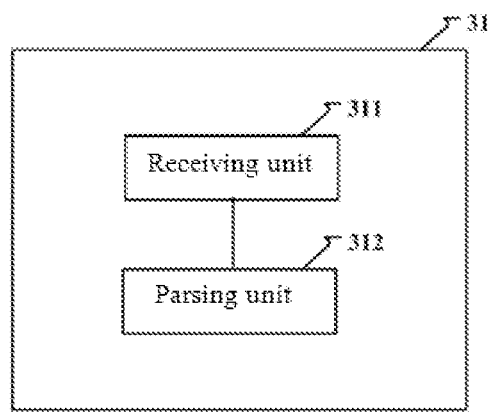
FIG. 4 is a block diagram of a receiving module in a video recommendation apparatus according to an embodiment of the present invention.

In an embodiment, as shown in FIG. 4, the receiving module 31 may include a receiving unit 311 configured to receive a broadcast data packet from the terminal device and a parsing unit 312 configured to parse the broadcast data packet to obtain the identity of the terminal device.

Figure 5:
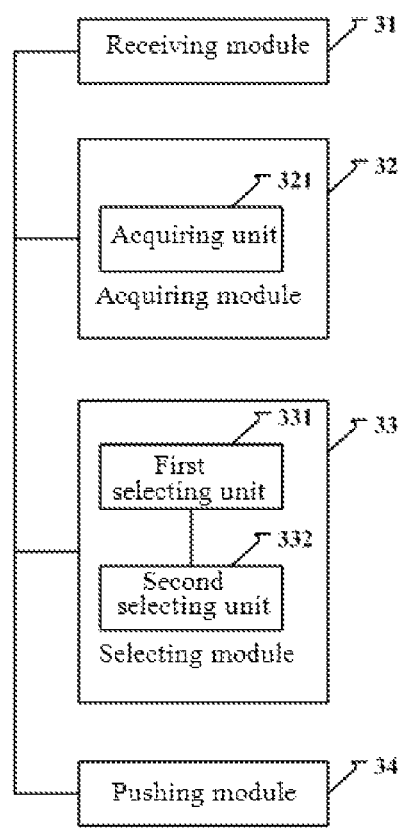
FIG. 5 is a block diagram of a video recommendation apparatus according to another embodiment of the present invention.

In an embodiment, as shown in FIG. 5, the acquiring module 32 may include an acquiring unit 321 configured to, when identities of at least two terminal devices are received, separately acquire user information associated with each of the identities to obtain at least two pieces of user information, the user information including personal information of a user and a viewing history of the user. The selecting module 33 may include a first selecting unit 331 configured to separately select video content that matches each of the identities and a second selecting unit 332 configured to select video content of the same type from the selected video content that matches each of the identities.

Figure 6:
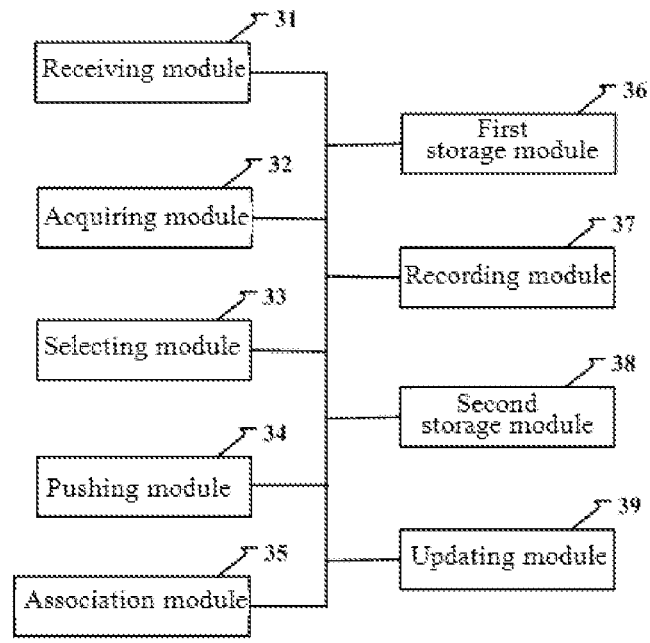
FIG. 6 is a block diagram of a video recommendation apparatus according to still another embodiment of the present invention.

In an embodiment, as shown in FIG. 6, the apparatus may further include an association module 35 configured to associate the identity with the user information and a first storage module 36 configured to store the identity and the user information that have been associated. Further, a recording module 37 is configured to record the video content that is broadcast, a second storage module 38 is configured to store the video content that is broadcast into the viewing history corresponding to the user information, and an updating module 39 is configured to update the viewing history corresponding to the user information. Each of the storage modules may comprise a non-transitory storage medium such as RAM, ROM, DRAM, a removable storage card, etc., and may comprises one or more types of such memory.

Figure 7:
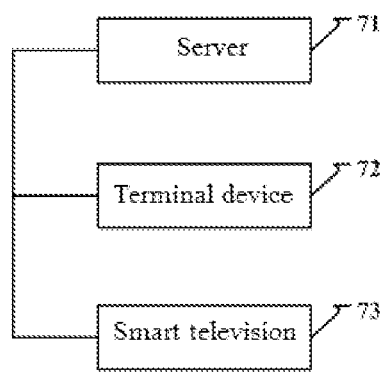
FIG. 7 is a block diagram of a video recommendation system according to another embodiment of the present invention.

An embodiment of the present invention may further provide a video pushing system. As shown in FIG. 7, the system includes a server 71, a terminal device 72, and a smart television 73.

The server 71 is configured to receive the identity of a terminal device, to acquire user information associated with the identity, the user information including personal information of a user and viewing history of the user, to select video content according to the user information, and to push the selected video content to the smart television, so that the smart television plays video according to the video content.

The terminal device 72 is configured to send a broadcast data packet, the broadcast data packet including the identity of the terminal device.

The smart television 73 is configured to receive the broadcast data packet from the terminal device. The smart television 73 then parses the broadcast data packet to obtain the identity of the terminal device and sends the identity to the server. Responsive thereto, the smart television 73 receives the video content pushed from the server and plays video according to the video content.

In an embodiment, the server 71 is further configured to receive the broadcast data packet from the terminal device and then parses the broadcast data packet to obtain the identity of the terminal device.

As will be appreciated by a person skilled in the art, the embodiments of the present invention may be embodied as a method, system, or computer program product. Accordingly, the present invention may take the form of an entirely hardware embodiment, or an entirely software embodiment, or an embodiment combining software and hardware aspects. Furthermore, the present invention may take the form of a computer program product that is implemented on one or more non-transitory computer-usable storage mediums (including but not limited to disk memories and optical memories) containing computer-usable program code.

The present invention has been described with reference to flowcharts and/or block diagrams of methods, apparatuses (systems) and computer program products. It will be appreciated that each step and/or block in the flowcharts and/or block diagrams, or combination thereof, may be implemented in computer program instructions. The computer program instructions may be loaded onto a processor of a general-purpose computer, a special-purpose computer, an embedded processing device or any other programmable data processing device to generate a machine, so that the instructions, when executed by the processor of the computer or other programmable data processing device, perform the functions specified in one or more steps and/or blocks in the flowcharts and/or block diagrams.

These computer program instructions may also be stored in a computer readable memory that may direct computers or other programmable data processing devices to operate in a specific manner, so that the instructions stored in the computer readable memory may generate a manufacture article containing instructions that perform the functions specified in one or more steps and/or blocks in the flowcharts and/or block diagrams.

These computer program instructions may also be loaded onto computers or other programmable data processing devices, so that the computers or other programmable data processing devices perform a sequence of operation steps for computer-implemented processing. When executed on the computers or other programmable data processing devices, the instructions provide steps for performing the functions specified in one or more steps and/or blocks in the flowcharts and/or block diagrams.

It will be apparent to a person skilled in the art that various modifications and variations can be made in the present invention without departing from the scope of the invention. Thus, it is intended that the present invention cover the modifications and variations of this invention provided they fall within the scope of the appended claims and their equivalents.

What is claimed is:

1. A method of pushing video content to a smart television, comprising:
    receiving, by the smart television, a first broadcast data packet from a first terminal device and a second broadcast data packet from a second terminal device, wherein the first and second terminal devices are associated with a respective user in proximity of the smart television;
    extracting, by the smart television, an identity of the first terminal device from the first broadcast data packet and an identity of the second terminal device from the second broadcast data packet;
    sending, by the smart television, the identity of the first terminal device and the identity of the second terminal device to a third device, wherein the smart television, the first terminal device, the second terminal device, and the third device are different devices;
    receiving, by the smart television, common video content selected by the third device without further interaction from the users associated with the first and second terminal devices, wherein the common video content is selected from video content selected separately for the identity of the first terminal device and video content selected separately for the identity of the second terminal device, wherein the video content selected separately for the first and second terminal devices is based on personal information and viewing history of the identity of the respective terminal device; and
    playing, by the smart television, the common video content selected and pushed by the third device.

2. The method according to claim 1, further comprising:
    prior to sending the identity of the first terminal device and the second terminal device:
    associating the identity of the first terminal device with the personal information of the user associated with the first terminal device;
    associating the identity of the second terminal device with the personal information of the user associated with the second terminal device; and
    storing the identity of the first terminal device, the personal information associated with the identity of the first terminal device, the identity of the second terminal device, and the personal information associated with the identity of the second terminal device.

3. The method according to claim 1, further comprising:
    recording the common video content that is pushed to the smart television; and
    sending a request, to the third device, to add the common video content into the viewing history associated with the identity of the first terminal device and the viewing history associated with the identity of the second terminal device.

4. The method of claim 1, wherein at least one of the first broadcast data packet or the second broadcast data packet is a Bluetooth broadcast data packet.

5. The method according to claim 1, wherein at least one of the first terminal device or the second terminal device is a smart wristband.

6. The method according to claim 1, wherein the personal information comprises at least one of acoustic settings, television color, or a preset channel.

7. The method according to claim 1, wherein the common video content is selected based on the video content selected separately for the user of the first terminal device and the video content selected separately for the user of the second terminal device being of a same type.

8. The method of claim 7, wherein the video content selected separately for the user of the first terminal device and the video content selected separately for the user of the second terminal device are of the same type when the video content selected separately for each identity of the respective terminal device includes a different version of a same video content item.

9. A video pushing apparatus, comprising:
a receiving module configured to receive a plurality of identities associated with a plurality of terminal devices;
an acquiring module configured to acquire user information associated with each of the plurality of identities, the user information comprising personal information and a viewing history of a user associated with each terminal device;
a selecting module configured to select common video content based on video contents selected separately for each of the plurality of identities of the terminal devices, wherein the video contents selected separately for each of the plurality of identities are based on the user information acquired by the acquiring module, wherein the selecting module selects the common video content without further interaction from the users associated with the respective terminal devices; and
a pushing processor configured to push the common video content to the smart television, so that the smart television plays the common video content selected by the selecting module.

10. The apparatus according to claim 9, further comprising:
an association processor configured to associate the identity with the user information; and
a first storage module configured to store the identity and the user information that have been associated.

11. The apparatus according to claim 9, further comprising:
a recording processor configured to record the video content that is pushed this time;
a second storage module configured to store the video content that is pushed this time into the viewing history corresponding to the user information; and
an updating processor configured to update the viewing history corresponding to the user information.

12. The apparatus of claim 9, wherein the broadcast data packet is a Bluetooth broadcast data packet.

13. The apparatus according to claim 9, wherein the selecting module is configured to first separately select video content for each identity of the respective terminal devices and then select the common video content from the separately selected video content that is of a same type.

14. The apparatus of claim 13, wherein video content is of the same type when the video content separately selected for each identity of the respective terminal devices includes a different version of a same video content item.

15. A video pushing system to a smart television, comprising:
a server configured to:
receive a plurality of identities associated with a plurality of terminal devices;
acquire user information associated with each of the plurality of identities, the user information comprising personal information of a user associated with each terminal device and a viewing history of the user;
separately select video content for each identity of the plurality of identities by selecting content based on the user information associated with the respective identity of the plurality of identities;
select a common video content based on the video content separately selected for each identity of the plurality of identities; and
push the common video content directly to the smart television, so that the smart television plays video according to the common video content;
at least one terminal device configured to send a broadcast data packet, the broadcast data packet comprising the identity of the terminal device; and
a smart television configured to:
receive a plurality of broadcast data packets from the plurality of terminal devices;
extract, from each of the plurality of broadcast data packets, the identity of an associated terminal device;
send the identities of the associated terminal devices to the server;
receive the common video content pushed directly from the server; and
play video according to the common video content.

16. The system of claim 15, wherein the broadcast data packet is a Bluetooth broadcast data packet.

17. The system of claim 15, wherein video content is of a same type when the video content separately selected for each identity of the plurality of identities includes a same video content item.

18. The system of claim 17, wherein the video content is of the same type when the video content separately selected for each identity of the plurality of identities includes a different version of the same video content item.

* * * * *